United States Patent
Fujii et al.

(10) Patent No.: US 9,039,787 B2
(45) Date of Patent: May 26, 2015

(54) METHOD OF MANUFACTURING SOLID ELECTROLYTIC CAPACITOR HAVING PILLOW PORTION CONNECTING ANODE TERMINAL AND ANODE LEAD

(71) Applicant: SANYO Electric Co., Ltd., Moriguchi-shi, Osaka (JP)

(72) Inventors: Eizo Fujii, Moriguchi (JP); Keisuke Matsuura, Moriguchi (JP); Shota Kurihara, Moriguchi (JP); Hitoshi Ibuta, Moriguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 235 days.

(21) Appl. No.: 13/685,481

(22) Filed: Nov. 26, 2012

(65) Prior Publication Data

US 2013/0135791 A1    May 30, 2013

(30) Foreign Application Priority Data

Nov. 25, 2011   (JP) ................................. 2011-257440

(51) Int. Cl.
  *H01G 9/00*    (2006.01)
  *H01G 9/008*   (2006.01)
  *H01G 9/15*    (2006.01)
  *H01G 9/012*   (2006.01)

(52) U.S. Cl.
  CPC ............ *H01G 9/0036* (2013.01); *H01G 9/008* (2013.01); *H01G 9/15* (2013.01); *Y10T 29/417* (2015.01); *H01G 9/0029* (2013.01); *H01G 9/012* (2013.01)

(58) Field of Classification Search
  None
  See application file for complete search history.

(56) References Cited

U.S. PATENT DOCUMENTS

| 2004/0125543 A1* | 7/2004 | Hirano et al. ................. 361/523 |
| 2008/0210065 A1* | 9/2008 | Noda et al. ......................... 83/14 |
| 2010/0073849 A1* | 3/2010 | Matsuzaki et al. ............ 361/529 |
| 2010/0271756 A1 | 10/2010 | Fujii et al. |

FOREIGN PATENT DOCUMENTS

| JP | 2001-035752 A | 2/2001 |
| JP | 2007-258496 A | 10/2007 |
| JP | 2008-091784 A | 4/2008 |

* cited by examiner

*Primary Examiner* — Scott B Geyer
(74) *Attorney, Agent, or Firm* — McDermott Will & Emery LLP

(57) ABSTRACT

A solid electrolytic capacitor includes a capacitor element, an anode terminal, and a cathode terminal. The anode terminal is electrically connected to the anode lead of the capacitor element through a pillow portion formed on a surface of the anode terminal. The cathode terminal is electrically connected to the cathode layer of the capacitor element. A method of manufacturing the solid electrolytic capacitor includes steps (a) and (b). In the step (a), a first printed portion to become the pillow portion is formed by performing printing on a predetermined place of the surface of the anode terminal with paste containing a conductive material and resin. In the step (b), the anode lead is connected to a tip end part of the first printed portion.

6 Claims, 5 Drawing Sheets

METHOD OF MANUFACTURING SOLID ELECTROLYTIC CAPACITOR HAVING PILLOW PORTION CONNECTING ANODE TERMINAL AND ANODE LEAD

INCORPORATION BY REFERENCE

Japanese patent application Number 2011-257440, upon which this patent application is based, is hereby incorporated by reference.

BACKGROUND OF THE INVENTION

1. Field of the Invention

The invention relates to a solid electrolytic capacitor and a method of manufacturing the same.

2. Description of Related Art

FIG. 7 is a sectional view of a conventional solid electrolytic capacitor. As shown in FIG. 7, the conventional solid electrolytic capacitor includes a capacitor element 81, an anode terminal 83, a cathode terminal 84, and a pillow member 85 having conductivity. The capacitor element 81 includes an anode body 811, an anode lead 812 implanted in the anode body 811, a dielectric layer 813 formed on a surface of a conductive material constituting the anode body 811, an electrolyte layer 814 formed on the dielectric layer 813, and a cathode layer 815 formed on the electrolyte layer 814. A pulled-out portion 812a of the anode lead 812 and the anode terminal 83 are electrically connected to each other through the pillow member 85. The cathode layer 815 and the cathode terminal 84 are electrically connected to each other through a conductive adhesive layer 86 provided therebetween.

In this solid electrolytic capacitor, the pillow member 85 and the anode lead 812 should be fastened to each other through means such as welding. Further, the height of the pillow member 85 should be controlled accurately at a certain dimension. The reason therefore is that a low degree of dimensional accuracy may generate failure in electrical connection between the anode lead 812 and the pillow member 85 or tilt of the capacitor element 81. So, manufacturing process becomes complicated. Additionally, a metal strip to become the pillow member 85 should be prepared. This makes it difficult to reduce manufacturing cost.

Technique of forming a stepped portion corresponding to the pillow member 85 by bending the anode terminal 83 is applicable to the aforementioned solid electrolytic capacitor. This technique eliminates the need for preparing a metal strip to become the pillow member 85. However, this technique in turn complicates manufacturing process. Further, the stepped portion and the anode lead 812 should be fastened to each other through means such as welding. Additionally, the height of the stepped portion should be controlled accurately at a certain dimension.

Technique of forming a pillow portion corresponding to the pillow member 85 by plating has been suggested in the aforementioned solid electrolytic capacitor. However, plating involves complicate process and calls for long time for formation of the pillow portion. Further, the pillow portion and the anode lead 812 should be fastened to each other through means such as welding. Additionally, the height of the pillow portion should be controlled accurately at a certain dimension.

SUMMARY OF THE INVENTION

A manufacturing method of the invention is a method of manufacturing a solid electrolytic capacitor. The solid electrolytic capacitor includes a capacitor element, an anode terminal, and a cathode terminal. The capacitor element includes an anode body, an anode lead implanted in the anode body, a dielectric layer formed on a surface of a conductive material constituting the anode body, an electrolyte layer formed on the dielectric layer, and a cathode layer formed on the electrolyte layer. The anode terminal is electrically connected to the anode lead through a pillow portion formed on a surface of the anode terminal. The cathode terminal is electrically connected to the cathode layer.

The manufacturing method includes steps (a) and (b). In the step (a), a first printed portion to become the pillow portion is formed by performing printing on a predetermined place of the surface of the anode terminal with paste containing a conductive material and resin. In the step (b), the anode lead is connected to a tip end part of the first printed portion.

A solid electrolytic capacitor of the invention includes a capacitor element, an anode terminal, and a cathode terminal. The capacitor element includes an anode body, an anode lead implanted in the anode body, a dielectric layer formed on a surface of a conductive material constituting the anode body, an electrolyte layer formed on the dielectric layer, and a cathode layer formed on the electrolyte layer. The anode terminal is electrically connected to the anode lead. More specifically, a pillow portion containing a conductive material and resin is formed on a surface of the anode terminal, and the anode lead is electrically connected to a tip end part of the pillow portion. The cathode terminal is electrically connected to the cathode layer.

DETAILED DESCRIPTION OF THE EMBODIMENTS

First Embodiment

Figure 1:
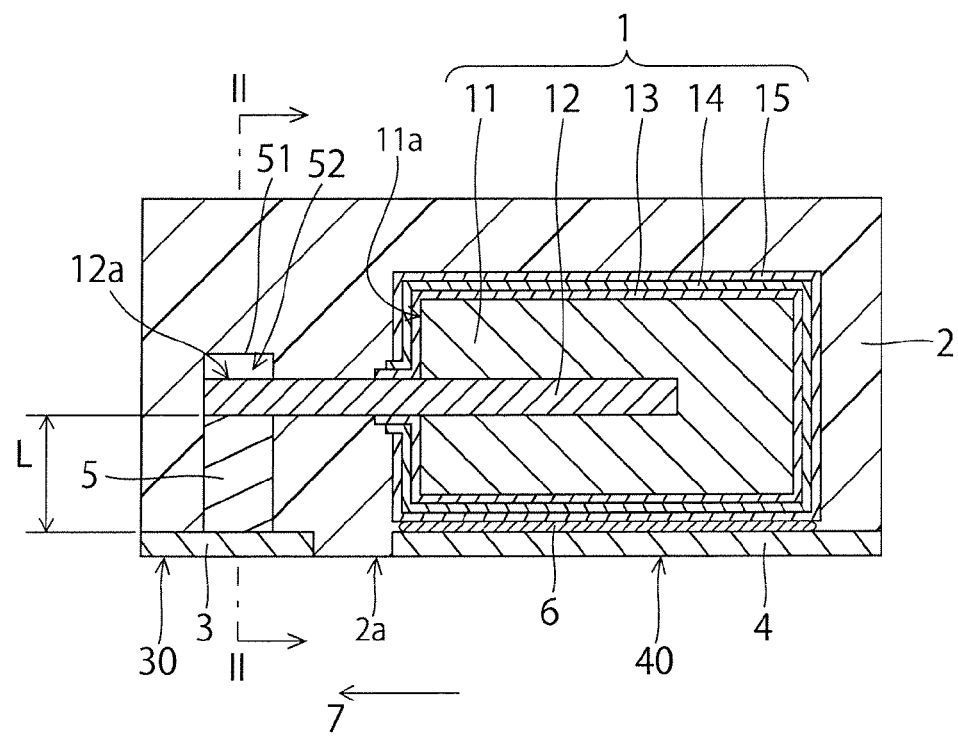
FIG. 1 is a sectional view of a solid electrolytic capacitor of a first embodiment of the invention.
Figure 2:
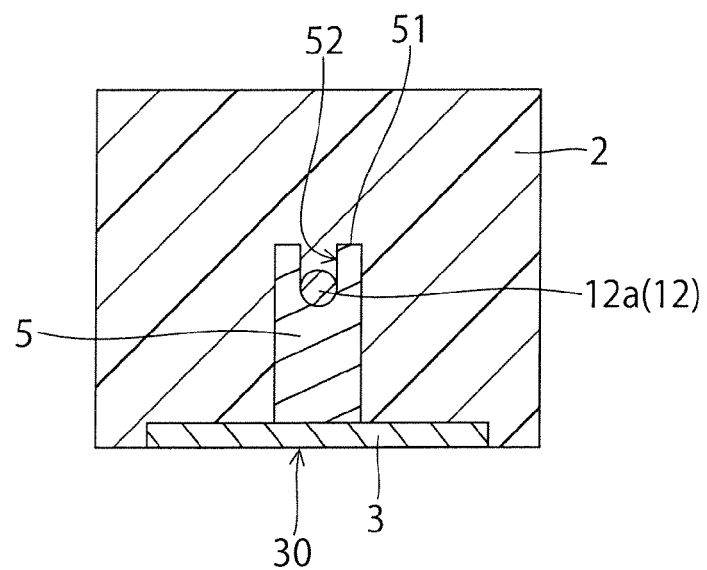
FIG. 2 is a sectional view taken along line II-II of FIG. 1.

FIG. 1 is a sectional view of a solid electrolytic capacitor of a first embodiment of the invention. FIG. 2 is a sectional view taken along line II-II of FIG. 1. As shown in FIG. 1, the solid electrolytic capacitor includes a capacitor element 1, an outer package 2, an anode terminal 3, and a cathode terminal 4. The capacitor element 1 includes an anode body 11, an anode lead 12, a dielectric layer 13, an electrolyte layer 14, and a cathode layer 15.

The anode body 11 is composed of a porous sintered body having conductivity. The anode lead 12 is implanted in the anode body 11. A part (pulled-out portion 12a) of the anode lead 12 is pulled out through the outer circumference of the anode body 11. More specifically, an implantation surface 11a through which the anode lead 12 is implanted exists in the outer circumference of the anode body 11, and the anode lead 12 is pulled out from the substantially central position of the implantation surface 11a. The anode lead 12 is composed of a wire having conductivity.

Conductive materials constituting the anode body 11 and the anode lead 12 are of the same type or different types. A valve metal such as titanium (Ti), tantalum (Ta), aluminum (Al) and niobium (Nb) is used as the conductive materials. In particular, titanium (Ti), tantalum (Ta), aluminum (Al) and niobium (Nb) are suitably materials to be used as oxides thereof (dielectric layer) achieve a high dielectric constant. The conductive materials may be an alloy mainly containing a valve metal such as an alloy composed of two or more valve metals, and an alloy composed of a valve metal and a different material.

The dielectric layer 13 is formed on a surface of the conductive material constituting the anode body 11. More specifically, the dielectric layer 13 is formed on the outer circumference of the anode body 11 and the inner circumferences of tiny holes existing in the anode body 11. The dielectric layer 13 is an oxide coating film formed by oxidizing the surface of the conductive material constituting the anode body 11. In FIG. 1, only part of the dielectric layer 13 formed on the outer circumference of the anode body 11 is shown schematically.

The electrolyte layer 14 is formed on the dielectric layer 13. More specifically, the electrolyte layer 14 is formed on the outermost surface of the dielectric layer 13 and inside the tiny holes existing in the anode body 11. The electrolyte layer 14 is composed of an electrolyte material that may be a conductive inorganic material such as manganese dioxide, or a conductive organic material such as TCNQ (tetracyano-quinodimethane) complex salt and conductive polymer. The electrolyte material is not limited to these conductive inorganic and organic materials, but various materials are applicable as the electrolyte material.

The cathode layer 15 is formed on the outermost surface of the electrolyte layer 14. More specifically, the cathode layer 15 is composed of a carbon layer (not shown in the drawings) formed on the outermost surface of the electrolyte layer 14, and a silver paint layer (not shown in the drawings) formed on the outer circumference of the carbon layer.

The anode and cathode terminals 3 and 4 are spaced apart from each other in a predetermined direction 7 (leftward direction in the plane of FIG. 1). The capacitor element 1 is mounted on the anode and cathode terminals 3 and 4 such that the pulled-out portion 12a of the anode lead 12 points in the direction 7 and faces the anode terminal 3, and that the cathode layer 15 faces the cathode terminal 4. The anode lead 12 is pulled out from the substantially central position of the implantation surface 11a. Thus, the pulled-out portion 12a is arranged to be spaced above from the anode terminal 3.

A pillow portion 5 having conductivity is formed on a surface (in FIG. 1, upper surface) of the anode terminal 3. The pillow portion 5 contains silver (Ag), and a binder consisting mainly of an epoxy resin and a phenol resin. The binder is contained in the pillow portion 5 in an amount of from 1 to 15 percent by weight of the pillow portion 5. The pillow portion 5 may contain a conductive material such as nickel (Ni) in place of or in addition to silver (Ag). Additionally, the pillow portion 5 may contain a different type of resin as a main constituent in place of or in addition to the epoxy resin and/or the phenol resin.

As shown in FIG. 2, a tip end part 51 of the pillow portion 5 has a recessed part 52 with a U-shaped curved inner surface. The pulled-out portion 12a is fastened to the inner surface of the recessed part 52. Thus, the pulled-out portion 12a is electrically connected to the tip end part 51 of the pillow portion 5, thereby electrically connecting the anode terminal 3 and the anode lead 12 through the pillow portion 5.

As shown in FIG. 1, the cathode terminal 4 and the cathode layer 15 are electrically connected to each other through a conductive adhesive layer 6 provided therebetween. The conductive adhesive layer 6 contains silver (Ag), and a binder consisting mainly of an epoxy resin and a phenol resin. The binder is contained in the conductive adhesive layer 6 in an amount from 1 to 15 percent by weight of the conductive adhesive layer 6. The conductive adhesive layer 6 may contain a conductive material such as nickel (Ni) in place of or in addition to silver (Ag). Additionally, the conductive adhesive layer 6 may contain a different type of resin as a main constituent in place of or in addition to the epoxy resin and/or the phenol resin.

The outer package 2 covers the capacitor element 1. Meanwhile, a lower surface 30 of the anode terminal 3 and a lower surface 40 of the cathode terminal 4 are exposed at a lower surface 2a of the outer package 2. The lower surfaces 30 and 40 form lower surface electrodes of the solid electrolytic capacitor. An electrical insulating material such as an epoxy resin is used as a material constituting the outer package 2.

A method of manufacturing the solid electrolytic capacitor of the first embodiment is described next. The manufacturing method includes an element forming step, a printing step, a mounting step, a thermal processing step, and an outer package forming step performed in this order. In the element forming step, an anode forming step, a dielectric layer forming step, an electrolyte layer forming step, and a cathode layer forming step are performed in this order.

In the anode forming step, powder of a valve metal is pressed into a predetermined shape with a die, thereby forming a molded body. At this time, the anode lead 12 is inserted into the die in order for the anode lead 12 to be implanted in the molded body. Next, the molded body is thermally processed to sinter the powder of the valve metal in the molded body, thereby forming a porous sintered body (anode body 11). At this time, the powder of the valve metal existing on a surface of the anode lead 12 unites with the anode lead 12, thereby integrating the anode lead 12 and the anode body 11.

In the dielectric layer forming step, the anode body 11 is subjected to chemical conversion process. More specifically, the anode body 11 is dipped in a chemical conversion solution such as a phosphorus acid solution and an adipic acid solution. Thus, the chemical conversion solution penetrates inside the tiny holes existing in the anode body 11. Then, a voltage is applied between the anode lead 12 and the chemical conversion solution, thereby electrochemically oxidizing a surface of the conductive material constituting the anode body 11 (anodic oxidation). As a result, an oxide coating film is formed on the surface of the conductive material constituting the anode body 11, and the oxide coating film becomes the dielectric layer 13.

In the electrolyte layer forming step, the electrolyte layer 14 is formed on the dielectric layer 13 by electropolymerization or chemical polymerization. More specifically, the anode body 11 is dipped in a polymerization solution of monomers and the like. Thus, the polymerization solution penetrates inside the tiny holes existing in the anode body 11. Then, the polymerization solution is polymerized electrically or chemically. As a result, a polymerization layer is formed on the dielectric layer 13, and the polymerization layer becomes the electrolyte layer 14.

In the cathode layer forming step, the carbon layer and the silver paint layer to become the cathode layer 15 is formed on the electrolyte layer 14. More specifically, the anode body 11 is dipped in carbon paste to form the carbon layer on the electrolyte layer 14. Next, the anode body 11 is dipped in silver paste to form the silver paint layer on the carbon layer. Then, formation of the capacitor element 1 is completed.

Figure 3:
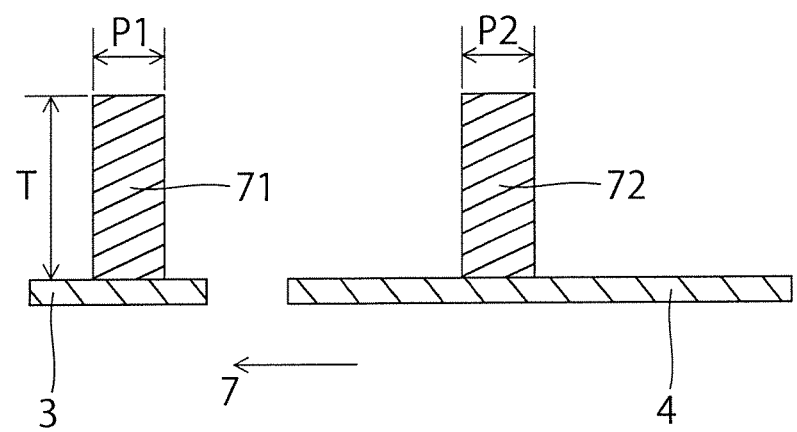
FIG. 3 is a sectional view used for explanation of a printing step performed in a method of manufacturing the solid electrolytic capacitor of the first embodiment.

FIG. 3 is a sectional view used for explanation of the printing step. In the printing step, paste is prepared first. The paste contains silver (Ag), and a binder consisting mainly of an epoxy resin and a phenol resin. The paste also contains diethylene glycol monobutyl ether as a solvent. The paste may contain a conductive material such as nickel (Ni) in place of or in addition to silver (Ag). A different type of solvent may be used in place of or in addition to diethylene glycol monobutyl ether.

Next, as shown in FIG. 3, the anode and cathode terminals 3 and 4 are arranged to be spaced apart from each other in the direction 7 (leftward direction in the plane of FIG. 3). Then, a predetermined place P1 of a surface (in FIG. 3, upper surface) of the anode terminal 3 is subjected to screen printing with the prepared paste, thereby forming a first printed portion 71 to become the pillow portion 5. In parallel with formation of the first printed portion 71, a predetermined place P2 of a surface (in FIG. 3, upper surface) of the cathode terminal 4 is subjected to screen printing with the same paste, thereby forming a second printed portion 72 to become the conductive adhesive layer 6.

More specifically, screen printing is performed several times on the places P1 and P2 to apply the paste repeatedly, thereby forming the first and second printed portions 71 and 72. In the printing step, screen printing is performed on the places P1 and P2 such that the first printed portion 71 achieves a height T greater than a distance L between the anode terminal 3 and the anode lead 12 as considered in the solid electrolytic capacitor to be manufactured (see FIG. 1). In the printing step, the first and second printed portions 71 and 72 may be formed not only by screen printing but also by various printing techniques.

If screen printing is employed as printing technique in the printing step as described above, it is preferable that the viscosity of the paste be 230 Pa·s. The inventors of the invention prepared pastes of four types having viscosities of 40 Pa·s, 50 Pa·s, 110 Pa·s, and 230 Pa·s, and performed screen printing with these pastes. As a result, the inventors found that the first printed portion 71 cannot be formed to a predetermined height with the pastes of the three types except that having the viscosity of 230 Pa·s.

Figure 4A:
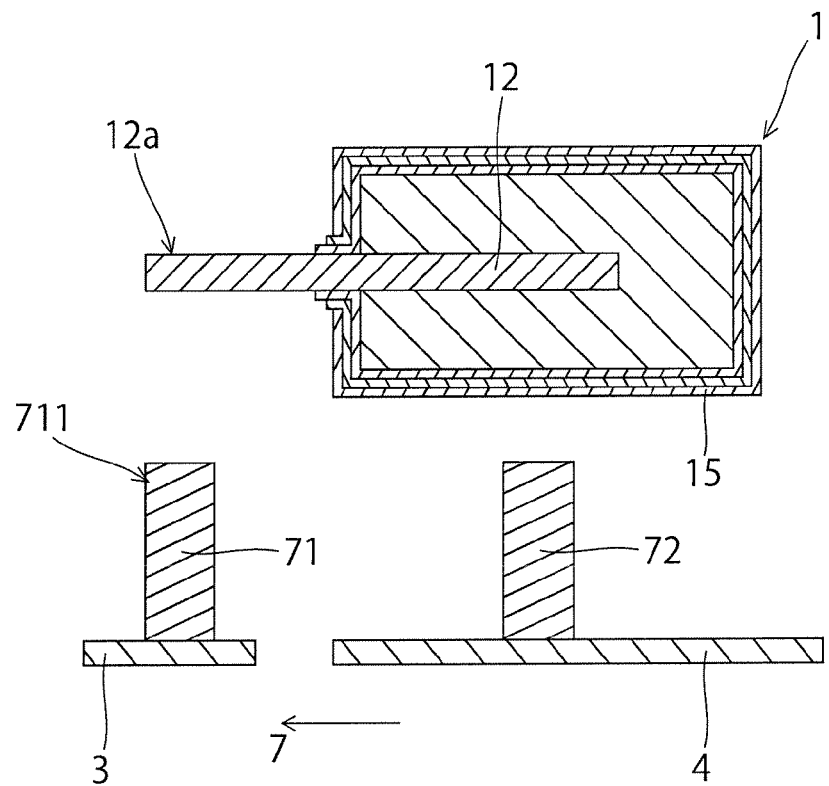
FIGS. 4A and 4B are sectional views used for explanation of a mounding step performed in the method of manufacturing the solid electrolytic capacitor of the first embodiment.
Figure 4B:
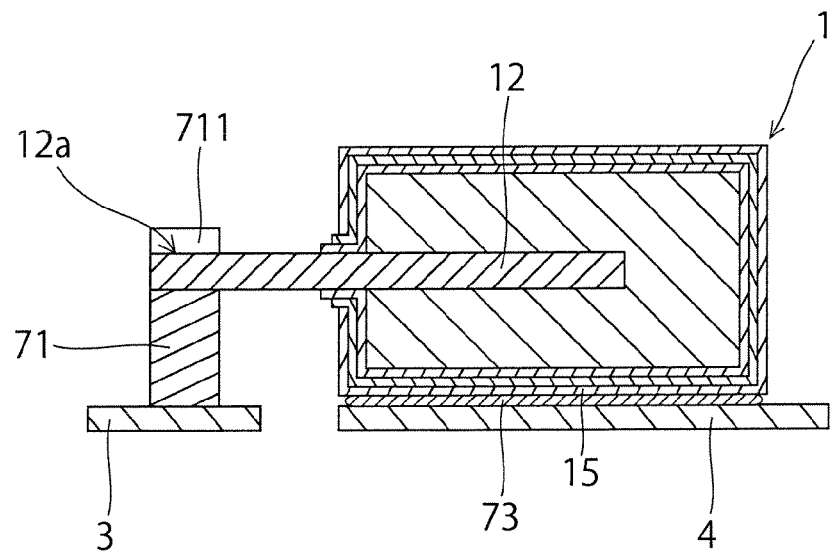

FIGS. 4A and 4B are sectional views used for explanation of the mounding step. In the mounting step, the capacitor element 1 is mounted on the anode and cathode terminals 3 and 4 as shown in FIGS. 4A and 4B. At this time, the pulled-out portion 12a of the anode lead 12 points in the direction 7 and faces the anode terminal 3, and the cathode layer 15 faces the cathode terminal 4. During mounting of the capacitor element 1, the pulled-out portion 12a is pressed against a tip end of the first printed portion 71, thereby embedding the pulled-out portion 12a into a predetermined position in the first printed portion 71 (see FIG. 2). Thus, the pulled-out portion 12a is connected to a tip end part 711 of the first printed portion 71. During mounting of the capacitor element 1, further, the cathode layer 15 is pressed against a tip end of the second printed portion 72, thereby flattening out the second printed portion 72. This places the paste constituting the second printed portion 72 between the cathode layer 15 and the cathode terminal 4. As a result, a paste layer 73 is formed between the cathode layer 15 and the cathode terminal 4 as shown in FIG. 4B.

In the thermal processing step, the first printed portion 71 and the paste layer 73 are thermally processed to form the pillow portion 5 and the conductive adhesive layer 6 out of the first printed portion 71 and the paste layer 73 respectively. More specifically, the first printed portion 71 and the paste layer 73 are thermally processed at a temperature of about 160° C. to disperse the solvent and the binder in the first printed portion 71 and the paste layer 73. In the pillow portion 5, the binder remains in an amount of from 1 to 15 percent by weight of the pillow portion 5. In the conductive adhesive layer 6, the binder remains in an amount of from 1 to 15 percent by weight of the conductive adhesive layer 6.

In the outer package forming step, the capacitor element 1 is covered with an electrical insulating material such as an epoxy resin to form the outer package 2. At this time, the lower surfaces 30 and 40 of the anode and cathode terminals 3 and 4 respectively are exposed at the lower surface 2a of the outer package 2. Then, formation of the solid electrolytic capacitor of FIG. 1 is completed.

In the aforementioned manufacturing method, the pillow portion 5 is formed by printing technique such as screen printing. So, compared to formation of a pillow portion by plating, the pillow portion 5 is formed by the simplified process and in shorted time. As a result, the solid electrolytic capacitor is manufactured by the simplified process.

In the aforementioned manufacturing method, screen printing is performed several times on the places P1 and P2 to apply the paste repeatedly, thereby forming the first and second printed portions 71 and 72 in the printing step. Thus, the first and second printed portions 71 and 72 can be formed to a predetermined height easily.

Further, in the aforementioned manufacturing method, screen printing is performed on the places P1 and P2 in the printing step such that the first printed portion 71 achieves the height T greater than the distance L. Then, in the mounting step, the pulled-out portion 12a is embedded into the predetermined position in the first printed portion 71. So, the pulled-out portion 12a is connected to the tip end part 711 of the first printed portion 71. Thus, complicate process such as welding for fastening between the anode lead 12 and the pillow portion 5 is unnecessary. Further, failure in electrical connection between the anode lead 12 and the pillow portion 5 or tilt of the capacitor element 1 is unlikely to occur. Additionally, a high degree of accuracy is not required in setting the height of the pillow portion 5, so that the pillow portion 5 can be formed easily.

Still further, in the aforementioned manufacturing method, the first and second printed portions 71 and 72 are formed simultaneously. To be specific, application of the paste to be placed between the cathode layer 15 and the cathode terminal 4 (formation of the paste layer 73) proceeds in parallel with formation of the first printed portion 71. Thus, the manufacturing process of the solid electrolytic capacitor is simplified further.

The structure of each part of the invention is not limited to that shown in the embodiment described above. Various modifications can be devised without departing from the technical scope recited in claims. By way of example, in the printing step, the second printed portion 72 may be formed in a step different from the step of forming the first printed portion 71. Further, in the mounting step, the capacitor element 1 may be mounted on the cathode terminal 4 in a step different from the step of mounting the capacitor element 1 on the anode terminal 3.

Additionally, in the printing step, the first and second printed portions 71 and 72 may be formed by performing screen printing once without applying the paste repeatedly. In this case, after screen printing is performed, the first and second printed portions 71 and 72 are pressed in order for the first and second printed portions 71 and 72 not to peel off the anode and cathode terminals 3 and 4 respectively during removal of a mask for printing from above the anode and cathode terminals 3 and 4.

In the aforementioned solid electrolytic capacitor, the anode lead 12 is pulled out from the substantially central position of the implantation surface 11a. However, the invention is not intended to be limited to this structure. The anode lead 12 may be pulled out from a position shifted toward an outer edge of the implantation surface 11a from the substantially central position.

Second Embodiment

A solid electrolytic capacitor of a second embodiment of the invention is described next. The structure of the second embodiment different from that of the first embodiment is described in detail below. The structure of the second embodiment is the same in other respects as that of the first embodiment, so that it will not be described again.

In the second embodiment, the pulled-out portion 12a of the anode lead 12 and a conductive material (such as silver (Ag)) constituting the pillow portion 5 are thermally fused together to make electrical connection between the anode lead 12 and the pillow portion 5. If a thin natural oxide film is formed on a surface of the pulled-out portion 12a, the fused part between the pulled-out portion 12a and the pillow portion 5 penetrates the natural oxide film. The conductive material contacting the pulled-out portion 12a is not required to be thermally fused with the pulled-out portion 12a entirely, but it may be thermally fused with the pulled-out portion 12a partially.

In a method of manufacturing the solid electrolytic capacitor of the second embodiment, after the aforementioned thermal processing step is performed, a contact part between the pulled-out portion 12a and the pillow portion 5 is subjected to thermal fusion process such as laser process and welding process to thermally fuse the pulled-out portion 12a and the conductive material together.

In the solid electrolytic capacitor of the second embodiment, the pulled-out portion 12a and the conductive material are thermally fused together, thereby reducing ESR (equivalent series resistance). Further, even if the thin natural oxide film is formed on the surface of the pulled-out portion 12a, the fused part formed by the thermal fusion process still penetrates the natural oxide film. Thus, failure in electrical connection is unlikely to occur, so that the ESR can be reduced easily.

If the thin natural oxide film is formed on the surface of the pulled-out portion 12a, the natural oxide film may be removed from the surface of the pulled-out portion 12a in advance, and then the pulled-out portion 12a and the pillow portion 5 may be connected mechanically and electrically. The natural oxide film may be removed by process such as polishing of the surface of the pulled-out portion 12a.

Third Embodiment

A solid electrolytic capacitor of a third embodiment of the invention is described next. The structure of the third embodiment different from that of the first or second embodiment is described in detail below. The structure of the third embodiment is the same in other respects as that of the first or second embodiment, so that it will not be described again.

Figure 5:
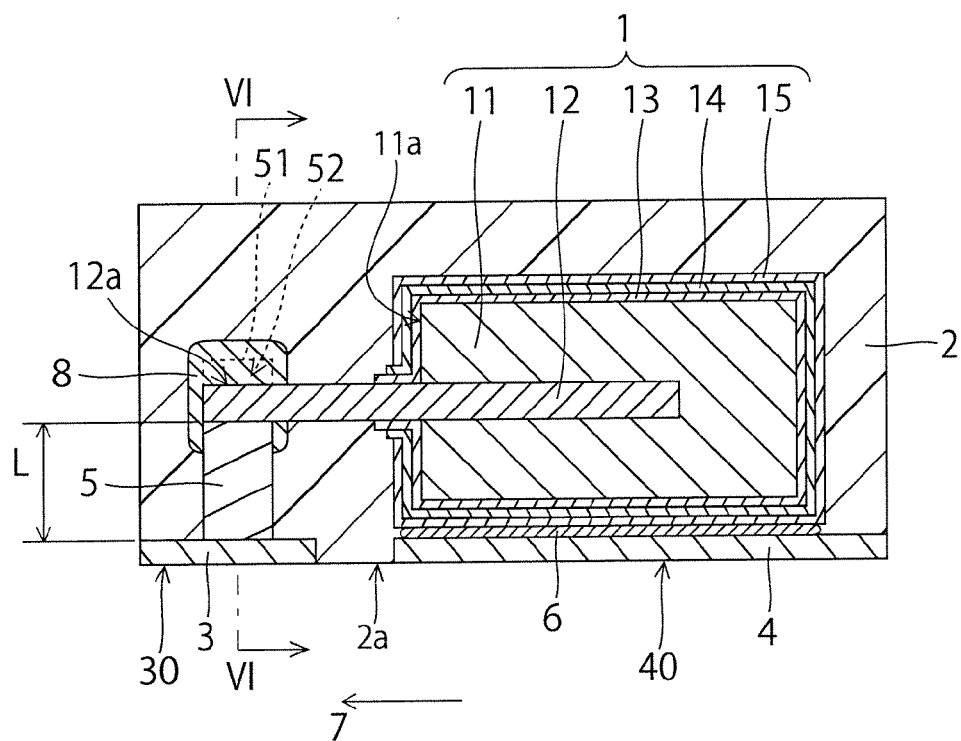
FIG. 5 is a sectional view of a solid electrolytic capacitor of a third embodiment of the invention.
Figure 6:
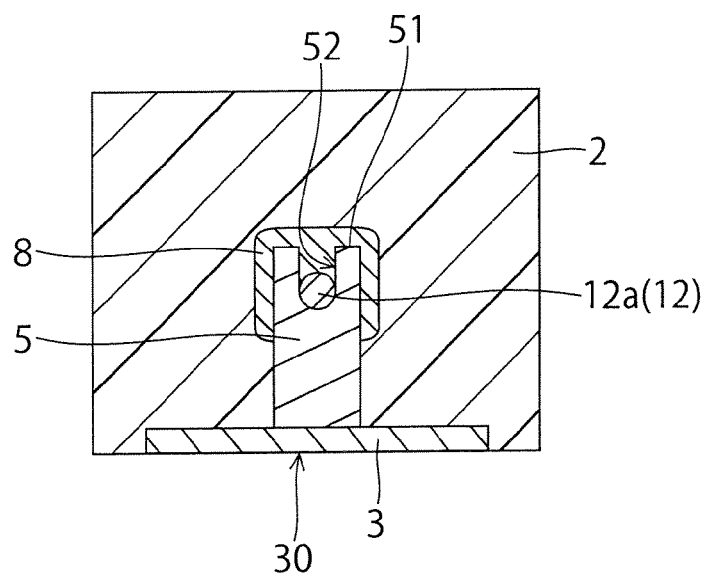
FIG. 6 is a sectional view taken along line VI-VI of FIG. 5.
Figure 7:
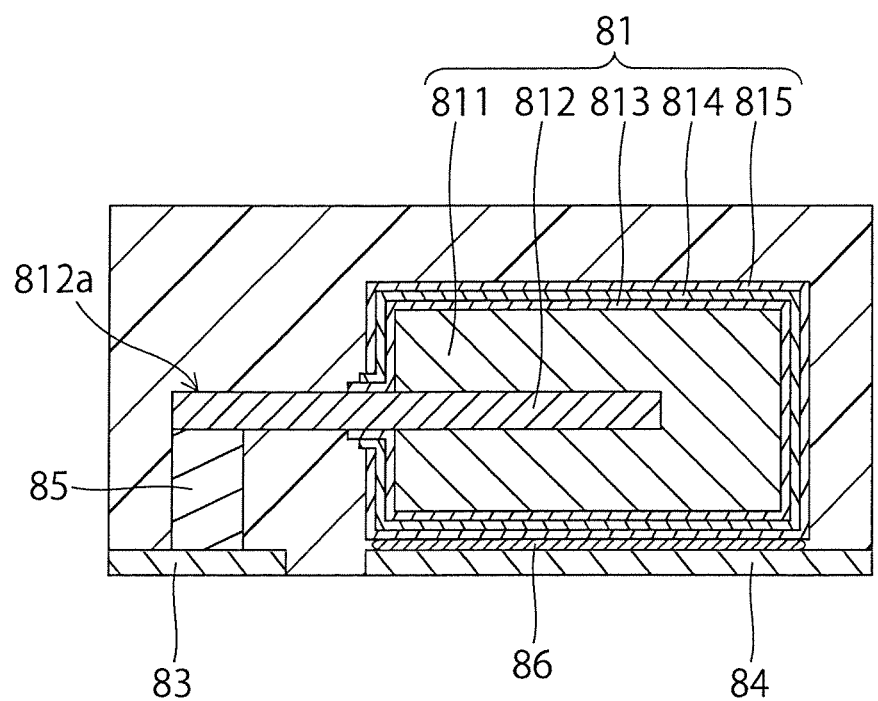
FIG. 7 is a sectional view of a conventional solid electrolytic capacitor.

FIG. 5 is a sectional view of the solid electrolytic capacitor of the third embodiment. FIG. 6 is a sectional view taken along line VI-VI of FIG. 5. In the third embodiment, a coating layer 8 is formed on electrical connection parts of the pulled-out portion 12a and the pillow portion 5 to cover the electrical connection parts as shown in FIGS. 5 and 6. The coating layer 8 may be made of the same conductive material as that of the pillow portion 5, or may be made of an electrical insulating resin material.

In a method of manufacturing the solid electrolytic capacitor of the third embodiment, after the aforementioned mounting step is performed, a coating material in the form of paste is applied to the electrical connection parts with a coating device such as a dispenser, and the applied coating material is dried, thereby forming the coating layer 8. Or, a coating material in the form of a sheet may be bonded to the electrical connection parts so as to cover the electrical connection parts, thereby forming the coating layer 8.

In the solid electrolytic capacitor of the third embodiment, the electrical connection parts are covered with the coating layer 8. Thus, the pulled-out portion 12a and the pillow portion 5 are connected reliably and firmly.

When the coating layer 8 has conductivity, the pulled-out portion 12a and the pillow portion 5 are electrically connected favorably, thereby reducing ESR. The coating layer 8 may have electrical insulating properties. In this case, even if the coating layer 8 is formed at a position shifted from its predetermined intended position so it contacts the cathode layer 15 of the capacitor element 1, an anode and a cathode are not electrically shorted. The coating layer 8 allows the pulled-out portion 12a and the pillow portion 5 to connect tightly with each other with higher strength.

The invention claimed is:

1. A method of manufacturing a solid electrolytic capacitor, the solid electrolytic capacitor including a capacitor element, an anode terminal, and a cathode terminal, the capacitor element including an anode body, an anode lead implanted in the anode body, a dielectric layer formed on a surface of a conductive material constituting the anode body, an electrolyte layer formed on the dielectric layer, and a cathode layer formed on the electrolyte layer, the anode terminal being electrically connected to the anode lead through a pillow portion formed on a surface of the anode terminal, the cathode terminal being electrically connected to the cathode layer, the method comprising the steps of:
(a) forming a first printed portion to become the pillow portion by repeatedly applying paste containing a conductive material and resin by performing printing several times on a predetermined place of the surface of the anode terminal; and
(b) connecting the anode lead to a tip end part of the first printed portion.

2. The method according to claim 1, further comprising the step of (c) thermally fusing the anode lead and the conductive material constituting the pillow portion by performing thermal fusion process on a contact part between the anode lead and the pillow portion.

3. A method of manufacturing a solid electrolytic capacitor, the solid electrolytic capacitor including a capacitor element, an anode terminal, and a cathode terminal, the capacitor element including an anode body, an anode lead implanted in the anode body, a dielectric layer formed on a surface of a conductive material constituting the anode body, an electrolyte layer formed on the dielectric layer, and a cathode layer formed on the electrolyte layer, the anode terminal being electrically connected to the anode lead through a pillow portion formed on a surface of the anode terminal, the cathode terminal being electrically connected to the cathode layer, the method comprising the steps of:
(a) forming a first printed portion to become the pillow portion by performing printing on a predetermined place of the surface of the anode terminal with paste containing a conductive material and resin; and (b) connecting the anode lead to a tip end part of the first printed portion, wherein:

in the step (a), printing is performed on the predetermined place such that the first printed portion achieves a height greater than a distance between the anode terminal and the anode lead as considered in the solid electrolytic capacitor to be manufactured; and in the step (b), the anode lead is embedded into a predetermined position in the first printed portion by pressing the anode lead against a tip end of the first printed portion.

4. The method according to claim 3, further comprising the step of (c) thermally fusing the anode lead and the conductive material constituting the pillow portion by performing thermal fusion process on a contact part between the anode lead and the pillow portion.

5. A method of manufacturing a solid electrolytic capacitor, the solid electrolytic capacitor including a capacitor element, an anode terminal, and a cathode terminal, the capacitor element including an anode body, an anode lead implanted in the anode body, a dielectric layer formed on a surface of a conductive material constituting the anode body, an electrolyte layer formed on the dielectric layer, and a cathode layer formed on the electrolyte layer, the anode terminal being electrically connected to the anode lead through a pillow portion formed on a surface of the anode terminal, the cathode terminal being electrically connected to the cathode layer, the method comprising the steps of:

(a) forming a first printed portion to become the pillow portion by performing printing on a predetermined place of the surface of the anode terminal with paste containing a conductive material and resin;

(b) connecting the anode lead to a tip end part of the first printed portion;

(d) forming a second printed portion by performing printing on a predetermined place of a surface of the cathode terminal with the paste, the step (d) being performed in parallel with the step (a); and (e) pressing the cathode layer against a tip end of the second printed portion to flatten out the second printed portion, thereby placing the paste constituting the second printed portion between the cathode layer and the cathode terminal.

6. The method according to claim 5, further comprising the step of (c) thermally fusing the anode lead and the conductive material constituting the pillow portion by performing thermal fusion process on a contact part between the anode lead and the pillow portion.

* * * * *